(12) United States Patent
Vandendorpe

(10) Patent No.: US 9,002,993 B2
(45) Date of Patent: Apr. 7, 2015

(54) DYNAMIC CONFIGURATION OF A CLIENT-SERVER RELATIONSHIP

(75) Inventor: Christian Vandendorpe, Amsterdam (NL)

(73) Assignee: Greenwave Systems Pte. Ltd., Singapore (SG)

( * ) Notice: Subject to any disclaimer, the term of this patent is extended or adjusted under 35 U.S.C. 154(b) by 186 days.

(21) Appl. No.: 13/072,974

(22) Filed: Mar. 28, 2011

(65) Prior Publication Data

US 2012/0254372 A1    Oct. 4, 2012

(51) Int. Cl.
*G06F 15/177*    (2006.01)
*H04L 29/06*    (2006.01)
*G06F 17/30*    (2006.01)

(52) U.S. Cl.
CPC .......... *H04L 67/42* (2013.01); *G06F 17/30861* (2013.01); *G06F 17/30283* (2013.01)

(58) Field of Classification Search
USPC ............... 709/203, 216, 220, 227, 228, 222
See application file for complete search history.

(56) References Cited

U.S. PATENT DOCUMENTS

| | | | |
|---|---|---|---|
| 4,918,690 A | 4/1990 | Markkula, Jr. et al. | |
| 5,519,878 A | 5/1996 | Dolin, Jr. | |
| 5,978,802 A * | 11/1999 | Hurvig | 710/200 |
| 6,199,204 B1 * | 3/2001 | Donohue | 717/178 |
| 6,389,370 B1 * | 5/2002 | Delaney et al. | 702/186 |
| 6,528,954 B1 | 3/2003 | Lys et al. | |
| 6,675,195 B1 * | 1/2004 | Chatterjee et al. | 709/203 |
| 6,880,010 B1 * | 4/2005 | Webb et al. | 709/227 |
| 7,014,336 B1 | 3/2006 | Ducharme et al. | |
| 7,651,245 B2 | 1/2010 | Thomas et al. | |
| 7,976,461 B2 | 7/2011 | Ertas et al. | |
| 7,987,246 B2 * | 7/2011 | Tsuji et al. | 709/220 |
| 8,055,747 B2 * | 11/2011 | Mazur et al. | 709/223 |
| 8,373,362 B2 | 2/2013 | Chemel et al. | |
| 8,504,702 B2 | 8/2013 | Diehl et al. | |
| 8,519,566 B2 | 8/2013 | Recker et al. | |
| 8,594,976 B2 | 11/2013 | Dorogi et al. | |
| 2002/0103765 A1 * | 8/2002 | Ohmori | 705/67 |
| 2003/0131150 A1 * | 7/2003 | Sugiura | 709/321 |
| 2004/0066652 A1 | 4/2004 | Hong | |

(Continued)

FOREIGN PATENT DOCUMENTS

| | | |
|---|---|---|
| KR | 1020090095689 A | 10/2009 |
| WO | 2009029960 A | 3/2009 |
| WO | 2010116299 A | 10/2010 |

OTHER PUBLICATIONS

Ableson (Ableson, Frank, Using XML and JSON with Android Part 1 Explore the benefits of JSON and XML in Android applications, Aug. 24, 2010, MSI Services Inc., retrieved from http://www.ibm.com/developerworks/library/x-andbene1/, pp. 1-5).*

(Continued)

*Primary Examiner* — Brian J Gillis
*Assistant Examiner* — Michael A Keller
(74) *Attorney, Agent, or Firm* — Bruce A. Young

(57) ABSTRACT

A network client may retrieve a unique ID for the network client and a first server identifier from within the network client. The network client may send the unique ID to a first server identified by the first server identifier. The first server may look up a second server identifier using the unique ID as a key in a database query and return the second server identifier to the network client. The network client may send data to a second server identified by the second server identifier.

19 Claims, 6 Drawing Sheets

(56) References Cited

U.S. PATENT DOCUMENTS

| | | |
|---|---|---|
| 2004/0175078 A1 | 9/2004 | Imamura |
| 2005/0149487 A1* | 7/2005 | Celik ............................... 707/1 |
| 2005/0231134 A1 | 10/2005 | Sid |
| 2006/0058009 A1* | 3/2006 | Vogedes et al. ............ 455/412.1 |
| 2006/0284734 A1 | 12/2006 | Newman |
| 2007/0041340 A1 | 2/2007 | Binder |
| 2007/0106777 A1* | 5/2007 | Ishida et al. ................. 709/223 |
| 2008/0074253 A1 | 3/2008 | Jeffery |
| 2008/0155069 A1* | 6/2008 | Kunhappan et al. .......... 709/220 |
| 2009/0022153 A1* | 1/2009 | Jain et al. ..................... 370/389 |
| 2009/0031381 A1 | 1/2009 | Cohen et al. |
| 2009/0150545 A1* | 6/2009 | Flores et al. ................. 709/224 |
| 2009/0185505 A1* | 7/2009 | Ripstein et al. .............. 370/254 |
| 2009/0207034 A1 | 8/2009 | Tinaphong et al. |
| 2009/0237006 A1 | 9/2009 | Champion et al. |
| 2009/0267540 A1 | 10/2009 | Chemel et al. |
| 2010/0083366 A1* | 4/2010 | Challener et al. ............... 726/17 |
| 2010/0088665 A1* | 4/2010 | Langworthy et al. ......... 717/104 |
| 2010/0114340 A1 | 5/2010 | Huizenga et al. |
| 2010/0157981 A1* | 6/2010 | Dawson ........................ 370/352 |
| 2010/0180016 A1* | 7/2010 | Bugwadia et al. ............ 709/220 |
| 2010/0197309 A1* | 8/2010 | Fang et al. .................... 455/436 |
| 2010/0281112 A1* | 11/2010 | Plamondon .................. 709/203 |
| 2011/0022931 A1* | 1/2011 | Eleftheriou et al. .......... 714/763 |
| 2011/0095687 A1 | 4/2011 | Jonsson |
| 2011/0095709 A1 | 4/2011 | Diehl et al. |
| 2011/0138377 A1* | 6/2011 | Allen ............................ 717/173 |
| 2011/0302567 A1* | 12/2011 | Kobylak et al. .............. 717/168 |
| 2012/0067754 A1 | 3/2012 | Holben |
| 2012/0098439 A1 | 4/2012 | Recker et al. |
| 2012/0201049 A1 | 8/2012 | Sherman et al. |
| 2012/0254372 A1 | 10/2012 | Vandendorpe |
| 2012/0312874 A1 | 12/2012 | Jonsson |
| 2012/0317224 A1* | 12/2012 | Caldwell et al. .............. 709/217 |

OTHER PUBLICATIONS

Vohra (Vohra, Manpreet, What are the benefits of using JSON over XML?, Apr. 4, 2010, DeveloperFeed, retrieved from http://www.developerfeed.com/json/faq/what-are-benefits-using-json-over-xml, pp. 1-2).*

Crockford, D., Network Working Group Request for Comments 4627, Jul. 2006, Published by Internet Engineering Task Force, retrieved on Mar. 25, 2011 from http://tools.ietf.org/pdf/rfc4627,pdf.

Extensible Markup Language (XML) 1.0 (Fifth Edition), edited by Tim Bray et al., Nov. 28, 2008, retreived on Mar. 25, 2011 from http://www.w3.org/TR/REC-xml/.

Diehl, W. et al., Providing Server Information to a Client, GWRPID-025, Unpublished U.S. Appl. No. 12/955,564, filed Nov. 29, 2010.

Notice of Allowance for U.S. Appl. No. 12/955,564 United States Patent and Trademark Office, Jan. 23, 2013.

"Lamp Module Receiver PLM03 User Manual," X10, Inc. 2008, http://www.x10pro.com/pro/pdf/plm03.pdf retrieved on May 25, 2010.

* cited by examiner

_US 9,002,993 B2_

DYNAMIC CONFIGURATION OF A CLIENT-SERVER RELATIONSHIP

BACKGROUND

1. Technical Field

The present subject matter relates to computer networking systems. If further relates to configuring a relationship between a network client and a server.

2. Description of Related Art

In a computer network, it is common for client devices and/or applications to communicate with server devices/applications over the computer network. In order for the client to communicate with the server, the client needs information on the server so that the network message can be properly addressed to the server.

Many networks use a protocol for addressing packets on a network called Internet Protocol (IP). Internet Protocol version 4 (IPv4), which is often used, assigns a 32 bit number to each device. This number, which is commonly referred to as an "IP Address," is often written in a form of 4 separate decimal numbers ranging from 0-255 separated by periods (e.g. 192.168.0.255). Network interfaces, routers and other networking infrastructure, can then use the IP Address to ensure that a network message is delivered to the proper recipient even if that device is not on the same physical network as the sender. IP Addresses may be manually assigned to each device, automatically assigned by Dynamic Host Configuration Protocol (DCHP) servers, or assigned using a variety of other methods. Additional granularity of addressing within a particular device may be provided by having port addresses within each IP Address.

In some cases, such as on the World Wide Web, servers are more commonly known by names, such as domain names like www.uspto.gov, instead of their underlying true IP Address. The Domain Name System (DNS) provides a system for converting a server name to an IP Address by sending a request to the IP Address of a known DNS database server which then looks up the IP Address for the domain name and sends a response back the original requestor with the server's IP Address.

BRIEF DESCRIPTION OF THE DRAWINGS

The accompanying drawings, which are incorporated in and constitute part of the specification, illustrate various embodiments. Together with the general description, the drawings serve to explain the principles of the invention. They should not, however, be taken to limit the invention to the specific embodiment(s) described, but are for explanation and understanding only. In the drawings.

DETAILED DESCRIPTION

Figure 1:
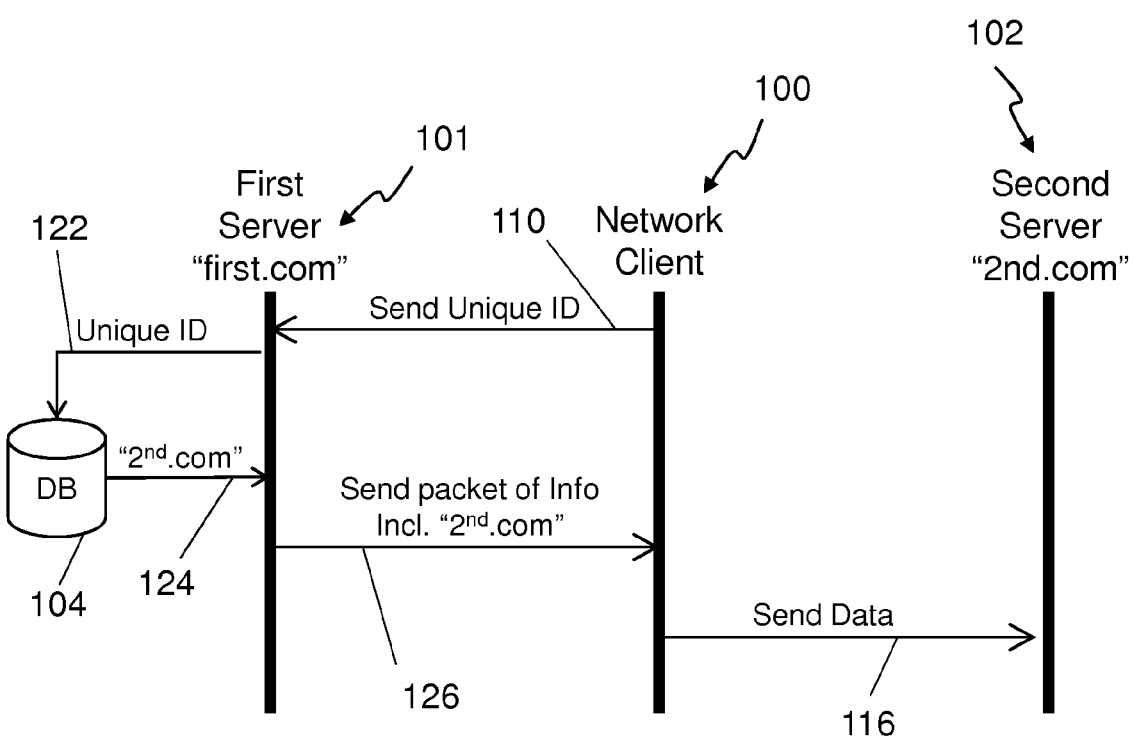
FIG. 1 depicts network messages sent between a network client, a first server and a second server.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Some descriptive terms and phrases are presented in the following paragraphs for clarity.

JavaScript Object Notation (JSON) is a lightweight text-based open standard designed for human-readable data interchange that is well known by those of ordinary skill in the art. JSON is described in the Network Working Group Request for Comments 4627, edited by D. Crockford and published July 2006 by the Internet Engineering Task Force, which may be found at http://tools.ieff.org/pdf/rfc4627,pdf.

Extensible Markup Language (XML) is a set of rules for encoding documents using character strings that allows for easy understanding by both humans and in machines that is also well known by those of ordinary skill in the art. XML is defined in the XML 1.0 Specification produced by the World Wide Web Consortium (W3C) and may be found at http://www.w3.org/TR/REC-xml/.

A network client for the purposes of this specification and claims is a device that communicates over a network that may be coupled to the internet and initiates an access to a server using a server identifier. A lighting gateway, as described herein, may be a network client, but network clients may be devices other than lighting gateways as well.

A server identifier is information that may allow a network client to contact a specific server or a specific service offered by a specific server. Examples of server identifiers may include, but are not limited to, Uniform Resource Locator (URL) strings or Internet Protocol (IP) addresses. In some embodiments, a server identifier may include a port address.

In the embodiments discussed below, a home or business environment may have one or more networked light bulbs, networked power strips, or other networked electrical appliances that may allow for control through a local area network (LAN). Many of these devices may also provide power management information including, but not limited to, instantaneous power used, the amount of power used over a period of time, power state and other status information. To simplify management of these devices, another networked device may act as a controller or monitor of those devices. In one embodiment, the device managing the other networked devices may be called a lighting gateway.

The lighting gateway, which may be referred to in the specification and claims below as a network client, may communicate with the various other networked devices, including networked electrical appliances and networked light bulbs, to monitor their status and in some cases to provide control functionality. The lighting gateway may collect any power management information or other status from the various other network devices and keep a log of that data that can be presented to a user and/or analyzed for purposes of monitoring and/or managing the electrical power used in a household or business. The lighting gateway may include computer program code to implement a web server allowing hypertext transfer protocol (HTTP) accesses from a web browser to view the data collected. The lighting gateway may send the data collected to a server over the internet instead of, or in addition to, providing access to it through a self-hosted web page.

In some embodiments a server identifier may be programmed into the lighting gateway at the time the lighting gateway is manufactured or at some other time before the lighting gateway is installed and put into service. This may allow the lighting gateway to function without extensive configuration by the end user. The server identifier that is programmed into the lighting gateway may identify a server that may be used to store the information collected by the lighting gateway from the various other networked devices on the LAN where it may be stored in a database running on the server.

In some instances, however, there may be a reason to have the lighting gateway access a different server than the server it was originally programmed for. Reasons for this could include the need to shift some of the load away from an overloaded server, assigning a particular set of lighting gateways to a server managed by another entity, such as a utility, or assigning a gateway to a particular server based on the geographic location where the lighting gateway is installed, although there could be other reasons for changing the server as well. Various embodiments described herein may allow for a lighting gateway, or network client, to be assigned to a different server without any user action required.

Reference now is made in detail to the examples illustrated in the accompanying drawings and discussed below.

FIG. 1 depicts network messages between a client device 100, a first server 101 and a second server 102. In this figure time progresses as one proceeds downward in the diagram. The client device 100 may initiate action by retrieving a unique identifier (ID) of the network client 100, as well as a server identifier, first.com in this embodiment, and sending that unique ID in a message 110 to the first server 101 at first.com. The protocol used for the message 110 may vary between embodiments and can be nearly any type of protocol as long as it is supported by both the network client 100 and the first server 101. In one embodiment, the protocol may be an HTTP protocol using Hypertext Markup Language (HTML) forms. In another embodiment, a file transfer protocol (FTP) may be used. In another embodiment, the protocol may utilize Personal Home Page or PHP: Hypertext Preprocessor (PHP) scripts. In another embodiment, the network client may utilize Common Gateway Interface (CGI) calls to execute remote procedure calls (RPC) on the server. Other embodiments may use other standard or proprietary protocols for communication between the network client 100 and the first server 101.

After the first server 101 receives the unique ID from the network client 100, the first server may access a database 104 using a query 122 that may include the unique ID as a key of the query 122 to retrieve a second server identifier 124, "$2^{nd}$.com in this embodiment. The database 104 may be managed locally on the first server 101 or on a different server located in the same datacenter as the first server, although in many embodiments, the database 104 may run on a different server that may be located remotely from the first server 101 and may be accessed over the internet. The database query 122 may also use other information in place of, or in addition to, the unique ID including, but not limited to, geographical information related to the network client 100 that may be determined based on the IP address of the network client 100 or geographical information or other data that may be received directly from the client in addition to or in place of the unique ID.

Once the second server identifier has been retrieved 124, the first server 101 may send a packet of information 126 that may include the second server identifier, to the network client 100. The packet of information 126 may be referred to as a master boot record (MBR) in various embodiments. In addition to the second server identifier, other information may be included in the packet of information. One embodiment may include a URL as the second server identifier, a first port number for use in communicating with the server without security, a second port number for use in communicating with the server using Secure Sockets Layer (SSL) security, a URL of a service on a server for finding updated firmware for the network client 100, an interval in seconds to wait between checking for updated firmware, a string to use as a NetBIOS name for the network client 100 on its local area network, and a URL for an web page on a server that may be used to access data that has been uploaded by the network client 100. Other embodiments may include more or less information in the packet of information 126 that is sent from the first server 101 to the network client 100.

Depending on the protocol used for communication between the network client 100 and the first server 101, the packet of information 126 may be formatted differently but in some embodiments, the packet may use JSON, while other embodiments may use XML, and yet other embodiments may format the data in a different way.

An example of a packet of information 126 formatted using JSON is:

```
{"GIPServer":"us-gip.greenwavereality.com",
"GIPServerPort":"49494",
"GIPSServerPort":"49495",
"FWUpdateURL":"http:\/\/update.greenwavereality.com\/roxy\/update.php",
"FWUpdateCheckInterval":"604800",
"HostName":"greenwave",
"UIRedirectURL":"http:\/\/trial.greenwavereality.com\/ui\/GWRMain.html"}
```

An example of a packet of information 126 with the same information as the packet above but formatted using XML is:

```
<mbr>
<GIPServer>gip.greenwavereality.com</GIPServer>
<GIPServerPort>49494</GIPServerPort>
<GIPSServerPort>49495</GIPSServerPort>
<FWUpdateURL>http:\/\/update.greenwavereality.com\/roxy\/update.php</FWUpdateURL>
<FWUpdateCheckInterval>604800</FWUpdateCheckInterval>
<HostName>greenwave</HostName>
<UIRedirectURL>http:\/\/trial.greenwavereality.com\/ui\/GWRMain.html</UIRedirectURL>
</mbr>
```

After the network client 100 has received the packet of information 126, it may send various data and information 116 to the second server 102. In one embodiment, the network client 100 may start the communication with the second server 102 using the same technique that was used to start the communication with the first server 110, which is by sending the unique ID of the network client 100 to the second server 102. In some embodiments, the second server 102 may at some point determine to connect the network client 100 with yet another server by sending it a new packet of information with another server identifier. In other cases, the second server 102 may manage another database that may be used to hold data related to the energy usage of the networked light bulbs and other networked appliances that has been gathered by the lighting gateway, or network client 100, and sent to the second server.

Figure 2:
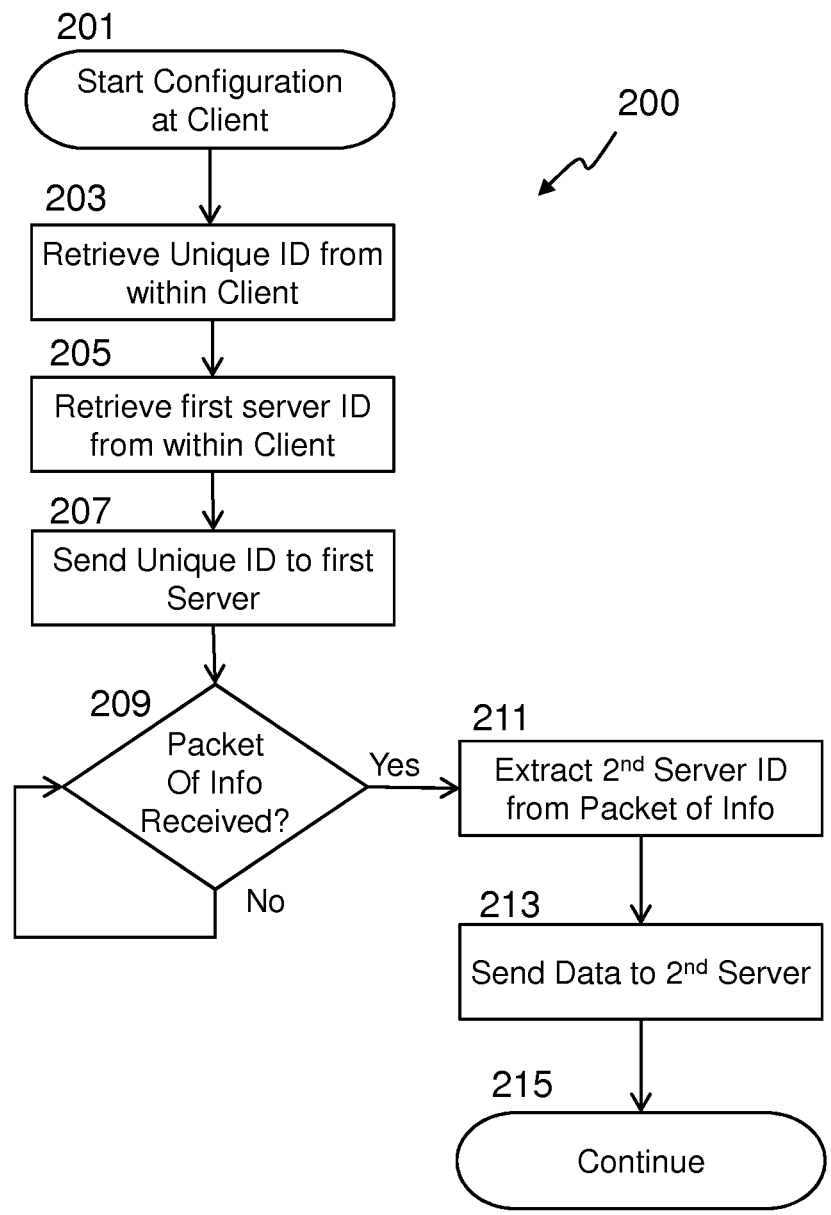
FIG. 2 is a flow chart for an embodiment in a network client.

FIG. 2 shows a flow chart 200 of an embodiment for a network client to dynamically configure a client-server relationship. The methods described may be embodied as circuitry, a hardware state machine, a processor executing firmware, a general purpose computer running a computer program from a non-transitory computer readable storage medium, or any combination of those elements and/or other means.

A network client 100, such as a lighting gateway, may determine to start configuration of the client-server relationship at block 201. In many embodiments this may occur soon after the network client 100 is powered on as a part of the initialization process of the network client 100. In some embodiments, the network client 100 may start the configuration process at some regular interval, such as once per hour, once per day, once per week, once per month, or any other interval. The network client 100 may retrieve a Unique ID at block 203 from within the network client 100. The Unique ID may be included in the network client 100 at the time that the network client is manufactured or at some other time before the network client 100 is installed by an end-user.

In some embodiments, the unique ID may be a Media Access Controller (MAC) address in the network controller of a network interface in the network client 100. The MAC address may consist of six byte value that is assigned to a network controller and is be unique for that particular instance of the network controller and may commonly be written in a hexadecimal (hex) format such as 01:23:45:67:89:AB. In other embodiments the unique ID may be the Home ID assigned to a Z-Wave® controller such as a ZM0301 from Sigma Designs. The Home ID is a 32 bit unique number pre-programmed into a Z-Wave controller. In other embodiments the unique ID may be an electronic serial number or some other unique number or string embedded in the network client 100. The unique ID may be included in a network controller chip or network interface included as a part of the network client 100, in the processor of the network client 100, in another chip on the network client 100, stored in non-transitory computer readable memory on the network client 100 such as non-volatile memory or hard disk drive, or embedded in some other way in the network client 100.

The network client 100 may retrieve a first server identifier from within the client at block 205. The first server identifier may be any set of information that allows the network client 100 to access the first server 101 but in at least one embodiment, the first server identifier may include a URL and at least one port number used for accessing the first server 101. The first server identifier may be stored using any method within the network client 100 but in at least one embodiment, the first server identifier may be stored on non-transitory computer readable storage medium in the network client 100. The first server identifier may be included in the network client 100 at the time that the network client is manufactured or at some other time before the network client 100 is installed by an end-user.

The network client 100 may send the Unique ID to the first server 101 at block 207 using the first server identifier. In many embodiments, the first server identifier may be in the form of a domain name or Uniform Reference Locator (URL) but in other cases, it may be an IP Address or other network addressing mechanism. Domain Name Services (DNS) may need to be utilized to determine the IP Address of the remote server if a domain name or URL is used.

Figure 4:
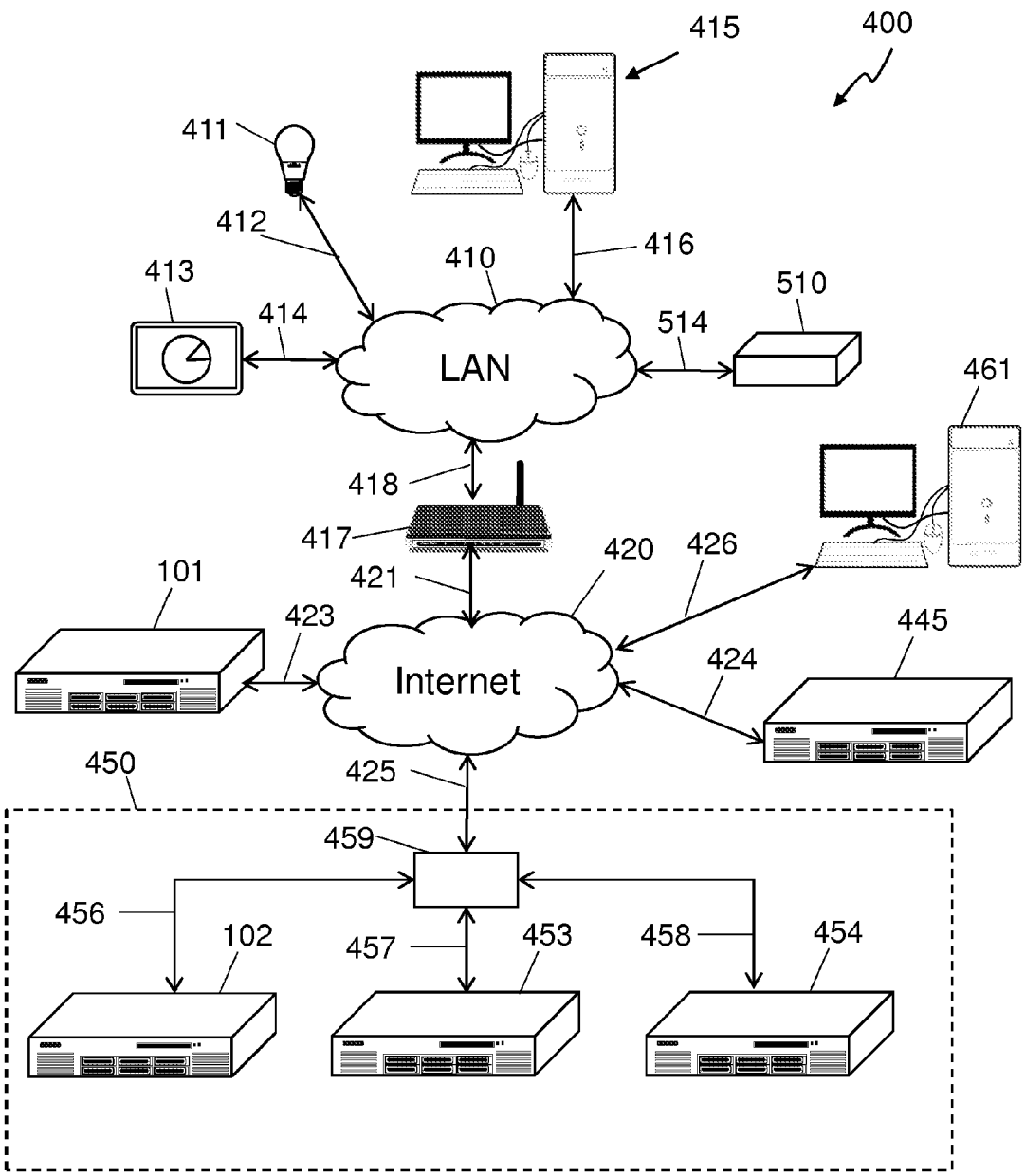
FIG. 4 shows a block diagram of a networked system suitable for an embodiment.

The path to the first server 101 may be back through the local area network, through an internet gateway device to an internet connection and through the internet to the remote server (see FIG. 4). In some embodiments, the first server 101 may not be located on the internet, but on another network subnet that is coupled to the LAN through one or more network routers or other network infrastructure. In yet other embodiments, the network client 100 may have a direct internet connection, allowing it to communicate with the first server 101 without going through the LAN. It is even possible that the first server 101 may be located on the LAN, running on a local PC or other device but not within the network client 100.

The protocols used for communication between the network client 100 and the first server 101 may vary between embodiments but in at least one embodiment, HTML web pages accessed using HTTP services may be used. In addition to HTML web pages, remote procedure calls (RPC) to services running on the first server 101 may be sent from the network client 100. The RPC interface may use any method of executing instructions on a remote processor including, but not limited to, Common Gateway Interface (CGI) scripts, Java Remote Method Invocation (Java RMI), Extensible Markup Language RPC (XML-RPC), Microsoft .NET Remoting, Simple Object Access Protocol (SOAP), Remote Python Calls (RPyC), Common Object Request Broker Architecture (CORBA), Distributed Ruby (DRb), or other mechanisms and protocols.

After the unique ID is sent to the first server 101 at block 207, the network client 100 may wait for a response from the first server 101 at block 209. When a packet of information is received, the network client 100 may proceed to block 211 and extract a second server identifier from the packet of information. The packet of information may be formatted in different ways in different embodiments but in some embodiments it may be formatted as a JSON object and in other embodiments formatted as an XML file.

Once the second server identifier has been extracted from the packet of information at block 211, the network client 100 may send data to the second server 102 using the second server identifier at block 213 and continue to any other tasks at block 215. The data sent to the second server 102 at block 213 may be any type of data including the unique ID, power usage information from other devices on the local network, or any other type of data.

Figure 3:
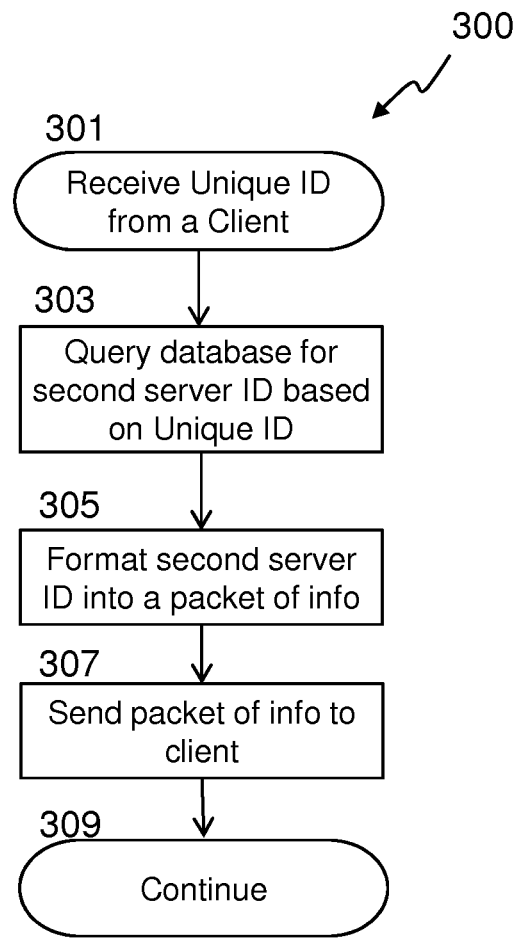
FIG. 3 is a flow chart for an embodiment in a server.

FIG. 3 shows a flow chart 300 of an embodiment for a first server 101 to dynamically configure a client-server relationship. The methods described may be embodied as circuitry, a hardware state machine, a processor executing firmware, a general purpose computer running a computer program from a non-transitory computer readable storage medium, or any combination of those elements and/or other means.

The first server 101 may receive a unique ID from a network client 100 at block 301. The first server 101 may then use the unique ID and/or geographical information related to the physical location of the networked client 100 and/or other information to retrieve a second server identifier from a database 104 at block 303. The database 104 may be managed locally on the first server 101 or on a different server located in the same datacenter as the first server 101, although in many embodiments, the database 104 may run on a different server that may be located remotely from the first server 101 and may be accessed over the internet.

Once the second server identifier has been retrieved at block 303, the first server 101 may create a packet of information that may include the second server identifier and format it according to the requirements of the particular embodiment at block 305. The packet of information may be formatted into a JSON object, an XML file, or any other type of format. The packet of information may then be sent to the network client 100 at block 307 and the first server 100 may continue with other tasks at block 309.

There may be several other services that a network client 100 may use from the first server 101, the second server 102, or some other server. One service that may be useful to a network client 100 is a database to store and manage information about the energy usage of networked light bulbs or other networked appliances on the local area network (LAN) of the networked client 100. This database may be provided by the second server in many embodiments although it could be provided by the first server or some other server.

Another service that may be useful to a network client 100 is a firmware update service to provide firmware upgrade files that may be used by the network client 100 to update the internal firmware or computer programs stored in the network client 100. The firmware upgrade service may be provided by a third server in many embodiments although the first server 101 or the second server 102 may provide the firmware upgrade service to the network client 100.

Another service that may be useful to a network client 100 or to a user is an HTTP service to serve HTML web pages to present data that may be stored in the database about the energy usage of the networked light bulbs or other networked appliances. Although at least some of the data collected by the network client 100, or lighting gateway, may be accessed at the network client 100 directly served by an internal web server in some embodiments, the user experience may be much richer if served from a remote server since the remote server may be a much more capable computer system with access to a more complete database or other information that may be interesting to the end user. For example, in one embodiment where household power monitoring and management services are being provided, the web server located in the network client 100 may have a fairly plain web page showing information that has been gathered about the household's power usage over the last 7 days where that information has been stored in the network client 100. But if the remote server is available, a much richer user experience with graphics and pictures may be provided due to the much larger storage resources that may be available on the remote server. And in addition to the household energy usage for the last 7 days (which may have been uploaded to the remote server by the network client 100), the remote server may provide data on the household energy usage going back much further in time, even up to several years' worth of data. And it may allow comparisons against the household's neighbors' usage or comparisons to national or regional averages, data that the local server may not have access to.

FIG. 4 shows a block diagram of a networked system 400 suitable for embodiments described herein. A local area network (LAN) 410 using any networking technology including, but not limited to, a wireless mesh network such as Z-wave or Zigbee (IEEE 802.15.4), may provide communication between multiple devices. Other wireless networks such as Wi-Fi (IEEE 802.11) might be used in a different embodiment. In other embodiments, a power line network such as X10 or HomePlug may be used. In additional embodiments, a wired network could be used such as Ethernet (IEEE 802.3). In other embodiments, an optical network might be employed and some embodiments may utilize a heterogeneous network with multiple types of networks. Those devices that may connect to the LAN 410 include, but are not limited to, a smart display 413 with network connection 414, a networked light bulb 411 with network connection 412, a personal computer (PC) 415, that may include a monitor, keyboard and mouse, and may run certain computer programs and having network connection 416, the lighting gateway 510 with network connection 514, and a network gateway 417 with network connection 418. The internet gateway 417 may also provide an internet connection 421 to the internet 420 and a variety of servers and services may be available on the internet.

A first server 101 may be connected to the internet 420 using internet connection 423 and be accessible to the network client 100 by use of the first server identifier. A data center 450 may include a router 459 that is connected to the internet 420 over internet connection 425 and may provide internet connectivity to a second server 102 through network connection 456, a third server 453 through network connection 457 and a fourth server 454 through network connection 458. The network client 100 may be able to access all three of the servers 102, 453, 454 in the data center 450. A fifth server 445 may be connected to the internet 420 through internet connection 424 and a workstation computer 461 may be connected to the internet 420 through internet connection 426. The various servers 101, 102, 453, 454, 445 and workstation 461 shown may be able to communicate with each other over the internet.

In some embodiments, the smart display 413 and/or a program running on PC 415 may act as the network client 100 but in the embodiment shown, the lighting gateway 510 may act as the network client 100. The lighting gateway 510 may gather energy information from the networked light bulb 411 and/or other networked appliances on the LAN 410. The smart display 413 may access the lighting gateway 510 and display some of the energy information that has been collected. The PC 415 may also access the lighting gateway 510 to display collected data or to provide additional analysis.

The lighting gateway 510 may retrieve a unique ID and first server identifier from within the lighting gateway 510 and send the unique ID to the first server 101 using the first server identifier. In the topology shown in FIG. 4, the lighting gateway 510 may accomplish this by sending a message through its network connection 514, over the LAN 410 and the network connection 418 through the internet gateway 417 and the internet connection 421, the internet 420 and the internet connection 423 to the first server 101. In some embodiments, the functionality of the lighting gateway 510 and the internet gateway 417 may be integrated into a single unit. In certain embodiments, the first server function may be implemented in the PC 415, or other device connected to the LAN 410 or other network coupled to the LAN 410 using routers, gateways or other network infrastructure.

The first server 101 may then access a database 104 to look up a second server identifier to send back to the lighting gateway 510. While in some embodiments, the database 104 may be running on the first server 101 although in many embodiments, the database 104 may be managed by another server, such as the fifth server 445, to provide information from the database 104 to multiple other servers. So the first server 101 may send the unique ID to the fifth server 445 to use as a key into the database 104 and retrieve the proper second server ID and, in some embodiments, other information to be returned to the lighting gateway 510. Once the first server 101 has received the second server ID and any other information from the database 104 on the fifth server 445, it can format the second server ID, along with the other information, into a packet of information to send back to the lighting gateway 510. To facilitate communication back to the lighting gateway 510 from the first server 101, a connection between the two devices may be established to help avoid problems with any firewalls or other security measures.

Once the packet of information has been received back at the lighting gateway 510, the lighting gateway 510 may extract the second server identifier and any other information from the packet of information. In at least one embodiment, the packet of information may include the second server identifier and port number to communicate with the second server 102 as well as server identifiers for a firmware update service running on the third server 453 and an HTTP service running on the fourth server 454. In many embodiments, a datacenter, such as datacenter 450, may provide those three services from a central location. The three services may each run on a separate server, or cluster of servers, or may be co-located on a single server, or two servers, or any other combination of servers. Other embodiments may provide those three services in separate locations. Some embodiments may not provide the firmware update service and/or the HTTP service, and other embodiments may provide other services in addition to or in place of, the services described.

Once the lighting gateway 510 has extracted the second server identifier from the packet of information received from the first server 101, it may send data to the second server 102 using the second server identifier. In many embodiments, the lighting gateway 510 may send energy usage data gathered from various local devices to the second server 102 and the second server 102 may manage a database containing the energy usage data received from the lighting gateway 510 and, in some cases, from other lighting gateways in other homes.

The workstation 461 may be used by a utility, a customer service representative, or other authorized party, to access the data on the database of the second server 102 and potentially from other similar servers holding energy data. This may allow the utility access to more detailed energy usage patterns than would be accessible using simple meter data. It may also allow a customer service representative to help a user to understand and manage the energy data from their home.

In another embodiment, the workstation 461, or some other computer with access to the internet 420, may be used to initiate an action of changing the server connection of the lighting gateway 510 from the second server 102 to a new server. At some earlier time, the lighting gateway 510 may have sent its unique ID to the second server 102 which may have stored that unique ID of the lighting gateway 510 in its database to show that the lighting gateway 510 has been assigned to the second server 102, and the lighting gateway 510 may have created an ongoing connection to the second server 201. A user at the workstation 461, or an application managing one or more servers that connect to network clients, may decide to change the server connection of the lighting gateway 510 and send a message over the internet 420 to the second server 102 with a new server identifier for a new server. Upon receipt of the new server identifier, the second server 102 may update its database record for the lighting gateway 510 to include the new server identifier. The second server 102 may send a new packet of information to the lighting gateway 510 that includes the new server identifier and the lighting gateway 510 may then disconnect from the second server 102 and connect to the new server, sending its unique ID and/or other data to the new server.

The HTTP service running on the fourth server 454 may access the database holding the energy usage data running on the second server 102 and present it back to the user in a more compelling and rich manner than can be accomplished using a simple web server running on the lighting gateway 510. The smart display 413 and or PC 415 may query the lighting gateway 510 to determine where to find the web pages showing energy usage data. If the remote HTTP service is not available, the lighting gateway 510 may simply provide its own IP address as the HTTP service for the smart display 413 or PC 415. If the remote HTTP service is available, the lighting gateway 510 may provide a server identifier for the fourth server 454 that was included in the packet information.

Many other systems and/or network topologies could be used for various embodiments. For example, the HTTP service may be provided by the second server 102 that is managing the database of energy data. Much more complex routing structures for the LAN 410 and internet 420 may be common in most embodiments. In various embodiments various functions may be merged or separated in ways than are different than described herein without departing from the scope of the present subject matter.

Figure 5:
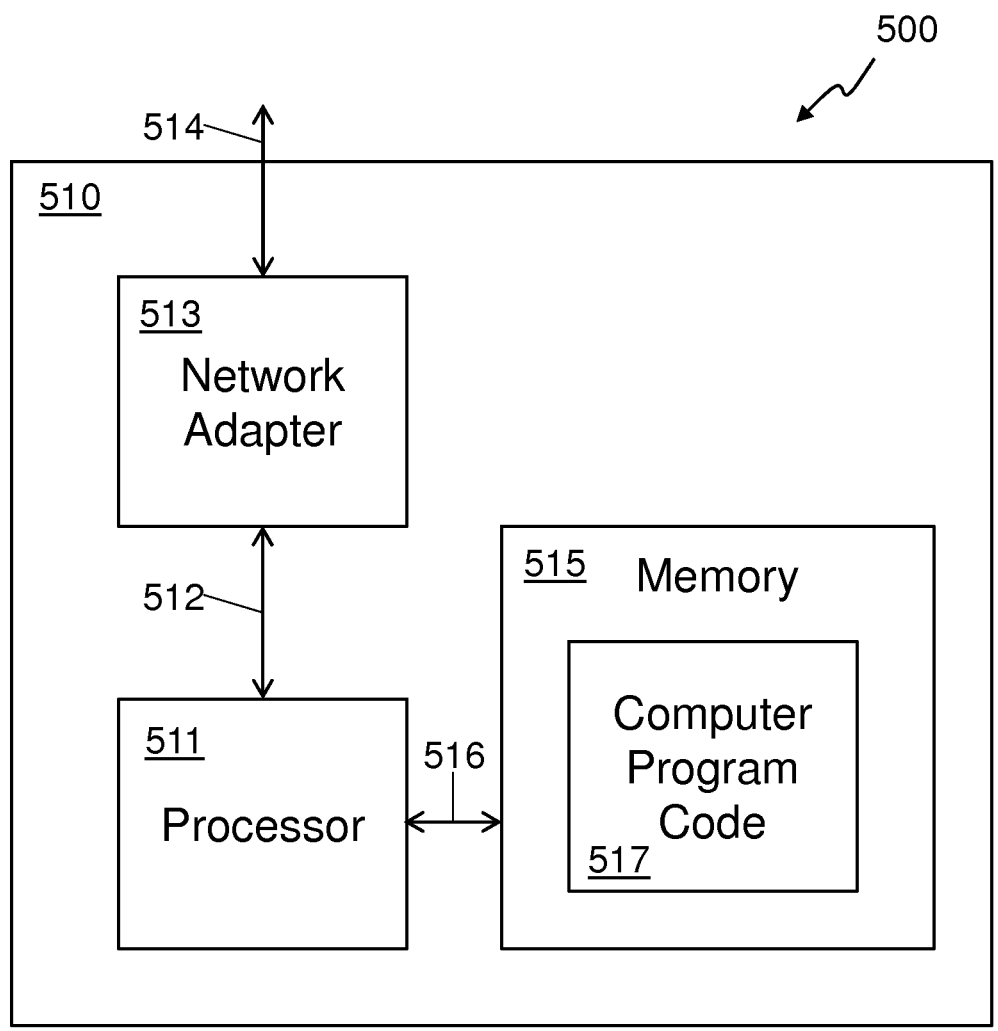
FIG. 5 shows a block diagram of a network client suitable for various embodiments.

FIG. 5 shows a block diagram 500 of a lighting gateway 510 which may function as a network client for a various embodiments. The lighting gateway 510 may have a processor 511 capable of executing computer instructions implementing computer programs having various functions. The processor 511 is coupled to a network interface 513 by a communications connection 512, allowing the processor 511 and the network interface 513 to send instructions and/or data to one another. In some embodiments, the processor 511 and the network interface 513 may be integrated onto a single semiconductor die and/or a single package. The network interface 513 has a network connection 514 suitable for connecting to a network. The network interface 513 and network connection 514 may be configured to support any type of computer network, including wired networks, radio frequency networks, power line communication networks, and optical networks. Wired networks that could be used include, but are not limited to, various speeds and configurations of IEEE 802.3 ethernet networking, infiniband, Multimedia over Coax Alliance (MoCA), or other standard and/or proprietary protocols. Radio frequency networks that could be used include, but are not limited to, various versions of IEEE 802.11 Wi-Fi, wireless mesh networks such as IEEE 802.15.4 ZigBee or Z-Wave, IEEE 802.16 WiMax and other "wireless" networks, standards based or proprietary, utilizing radio frequency communication. Power line communication networks that could be used include, but are not limited to, protocols published by the HomePlug Powerline Alliance, the Universal Powerline Association, the HD-PLC Alliance, the ITU-T, or other standards based or proprietary powerline communication protocols. In some embodiments, the networked device 510 may have more than one network interface and network connection, allowing it to communicate over multiple networks that may implement the same or different protocols or types of networking.

The networked device 510 may also include memory 515 or other non-transitory computer readable storage medium coupled to the processor 511 with a communications connection 516. In some embodiments, the processor 511 and the memory 515 may integrated into a single semiconductor die and/or a single package. The memory 515 may be implemented using dynamic random access memory (DRAM) chips, synchronous dynamic random access memory (SDRAM), double data rate random access memory (DDR), NOR or NAND type flash memory chips, static random access memory (SRAM), electrically erasable programmable read only memory (EEPROM), read only memory (ROM), programmable read only memory (PROM), hard disk, CD ROM, DVD ROM, or any other computer readable storage medium, volatile or non-volatile. The memory 515 may hold computer program code 517 that is readable and executable by the processor 511. The computer program code 517 may be configured to implement the methods described above including the method shown in flow chart 200 in FIG. 2.

Figure 6:
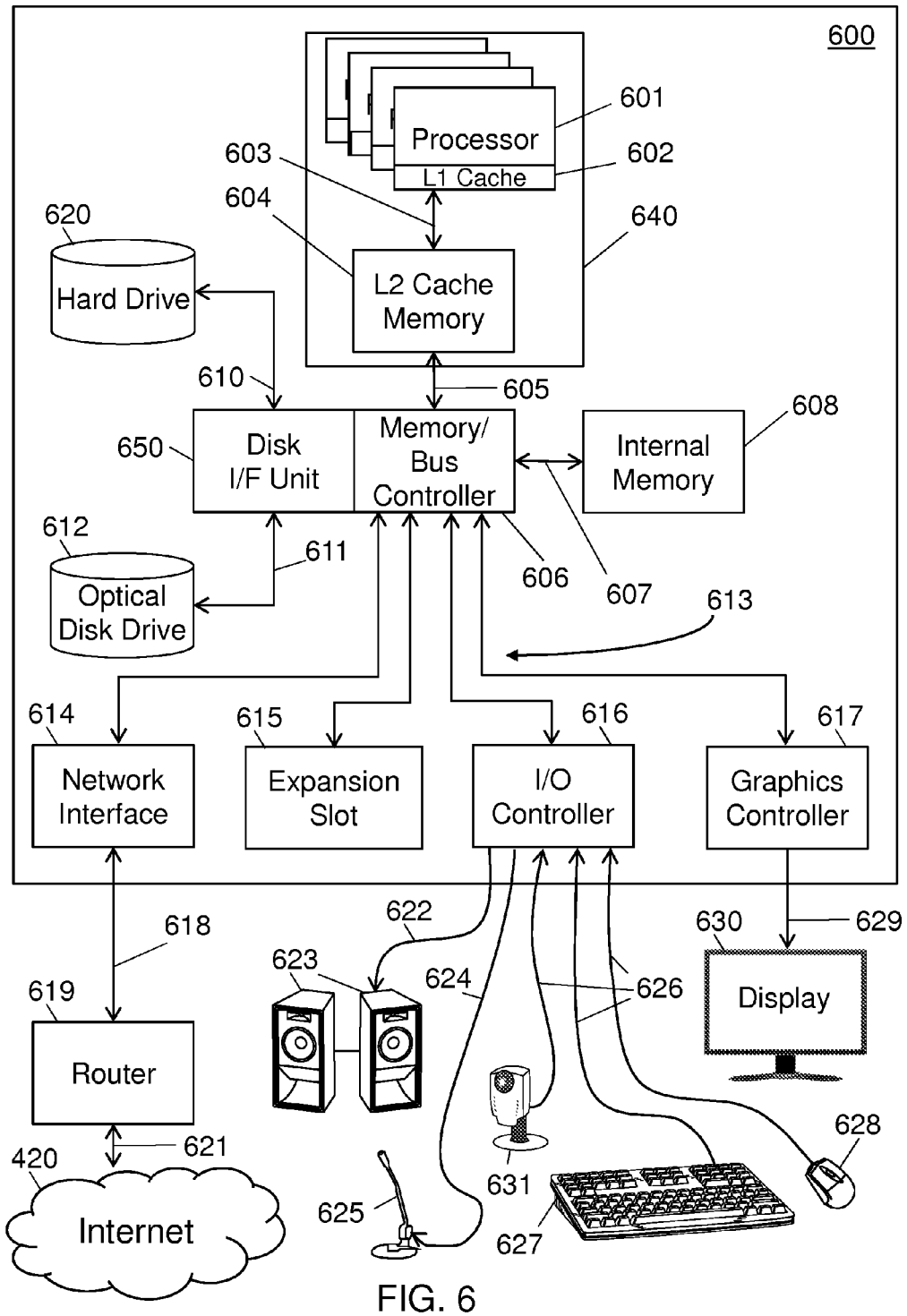
FIG. 6 shows a block diagram of a server suitable for various embodiments.

FIG. 6 depicts details of a computer system 600 suitable for implementing various embodiments of the various servers 101, 102, 453, 454, 445, workstation 461 or PC 415. The computer system 600 may be configured in the form of a desktop computer, a laptop computer, a mainframe computer, or any other hardware or logic arrangement capable of being programmed or configured to carry out instructions. In some embodiments the computer system 600 may act as a server, accepting inputs from a remote user over a local area network (LAN) 618 or the internet 420. In other embodiments, the computer system 600 may function as a smart user interface device for a server on a LAN 618 or over the internet 420. The computer system 600 may be located and interconnected in one location, or may be distributed in various locations and interconnected via communication links such as a LAN 618 or a wide area network (WAN), via the Internet 420, via the public switched telephone network (PSTN), a switching network, a cellular telephone network, a wireless link, or other such communication links. Other devices may also be suitable for implementing or practicing the embodiments, or a portion of the embodiments. Such devices include personal digital assistants (PDA), wireless handsets (e.g., a cellular telephone or pager), and other such electronic devices preferably capable of being programmed to carry out instructions or routines. One skilled in the art may recognize that many different architectures may be suitable for the computer system 600, but only one typical architecture is depicted in FIG. 6.

Computer system 600 may include a processor 601 which may be embodied as a microprocessor, two or more parallel processors, a central processing unit (CPU) or other such control logic or circuitry. The processor 601 may be configured to access a local cache memory 602, and send requests for data that are not found in the local cache memory 602 across a cache bus 603 to a second level cache memory 604. Some embodiments may integrate the processor 601, and the local cache 602 onto a single integrated circuit and other embodiments may utilize a single level cache memory or no cache memory at all. Other embodiments may integrate multiple processors 601 onto a single die and/or into a single package. Yet other embodiments may integrate multiple processors 601 with multiple local cache memories 602 with a second level cache memory 604 into a single package 640 with a front side bus 605 to communicate to a memory/bus controller 606. The memory/bus controller 606 may accept accesses from the processor(s) 601 and direct them to either the internal memory 608 over memory bus 607 or to the various input/output (I/O) busses 610, 611, 613. A disk interface unit 650 may connect to the communication link 610 to the hard disk drive 620 and/or or other communication link 611 to the optical disks 612 and may be integrated into the memory/bus controller 606 or may be a separate chip. Some embodiments of the computer system 600 may include multiple processor packages 640 sharing the front-side bus 605 to the memory/bus controller. Other embodiments may have multiple processor packages 640 with independent front-side bus connections to the memory/bus controller 606. The memory bus controller 606 may communicate with the internal memory 608 using a memory bus 607. The internal memory 608 may include one or more of random access memory (RAM) devices such as synchronous dynamic random access memories (SDRAM), double data rate (DDR) memories, or other volatile random access memories. The internal memory 608 may also include non-volatile memories such as electrically erasable/programmable read-only memory (EEPROM), NAND flash memory, NOR flash memory, programmable read-only memory (PROM), read-only memory (ROM), battery backed-up RAM, or other non-volatile memories. The various memory devices may be embodiments of a non-transitory computer readable storage medium suitable for storing computer program code and/or data. In some embodiments, the computer system 600 may also include 3rd level cache memory or a combination of these or other like types of circuitry configured to store information in a retrievable format. In some implementations the internal memory 608 may be configured as part of the processor 601, or alternatively, may be configured separate from it but within the same package 640. The processor 601 may be able to access internal memory 608 via a different bus or control lines than is used to access the other components of computer system 600.

The computer system 600 may also include, or have access to, one or more hard disk drives 620 (or other types of storage memory) and optical disk drives 612. Hard disk drives 620 and the optical disks for optical disk drives 612 are examples of non-transitory machine readable (also called computer readable) mediums suitable for storing computer program code and/or data. The optical disk drives 612 may include a combination of several disc drives of various formats that can read and/or write to removable storage media (e.g., CD-R, CD-RW, DVD, DVD-R, DVD-W, DVD-RW, HD-DVD, Blu-Ray, and the like). Other forms or computer readable media that may be included in some embodiments of computer system 600 include, but are not limited to, floppy disk drives, 9-track tape drives, tape cartridge drives, solid-state drives, cassette tape recorders, paper tape readers, bubble memory devices, magnetic strip readers, punch card readers or any other type or computer useable storage medium. The computer system 600 may either include the hard disk drives 620 and optical disk drives 612 as an integral part of the computer system 600 (e.g., within the same cabinet or enclosure and/or using the same power supply), as connected peripherals, or may access the hard disk drives 620 and optical disk drives 612 over a network, or a combination of these. The hard disk drive 620 often includes a rotating magnetic medium configured for the storage and retrieval of data, computer programs or other information. The hard disk drive 620 also often includes a disk controller capable of controlling the motor to rotate the storage medium as well as access the data on the medium. In some embodiments, an additional drive may be a solid state drive using semiconductor memories. In other embodiments, some other type of computer useable medium may be used. The hard disk drive 620 need not necessarily be contained within the computer system 600. For example, in some embodiments the hard disk drive 620 may be server storage space within a network that is accessible to the computer system 600 for the storage and retrieval of data, computer programs or other information. In some instances the computer system 600 may use storage space at a server storage farm, or like type of storage facility, that is accessible by the Internet 420 or other communications lines. The hard disk drive 620 is often used to store the software, instructions and programs executed by the computer system 600, including for example, all or parts of the computer application program for carrying out activities of the various embodiments.

The disk interface 610 and/or communication link 611 may be used to access the contents of the hard disk drives 620 and optical disk drives 612. These interfaces/links 610, 611 may be point-to-point links such as Serial Advanced Technology Attachment (SATA) or a bus type connection such as Parallel Advanced Technology Attachment (PATA) or Small Computer System Interface (SCSI), a daisy chained topology such as IEEE-1394, a link supporting various topologies such as Fibre Channel, or any other computer communication protocol, standard or proprietary, that may be used for communication to computer readable medium.

The memory/bus controller may also provide other I/O communication links 613. In some embodiments, the links 613 may be a shared bus architecture such as peripheral component interface (PCI), microchannel, industry standard architecture (ISA) bus, extended industry standard architecture (EISA) bus, VERSAmodule Eurocard (VME) bus, or any other shared computer bus. In other embodiments, the links 613 may be a point-to-point link such as PCI-Express, Hyper-Transport, or any other point-to-point I/O link. Various I/O devices may be configured as a part of the computer system 600. In many embodiments, a network interface 614 may be included to allow the computer system 600 to connect to a network 618. The network 618 may be an IEEE 802.3 ethernet network, an IEEE 802.11 Wi-Fi wireless network, or any other type of computer network including, but not limited to, LANs, WAN, personal area networks (PAN), wired networks, radio frequency networks, powerline networks, and optical networks. A router 619 or network gateway, which may be a separate component from the computer system 600 or may be included as an integral part of the computer system 600, may be connected to the network 618 to allow the computer system 600 to communicate with the internet 420 over an internet connection 621 such as an asymmetric digital subscriber line (ADSL), data over cable service interface specification (DOCSIS) link, T1 or other internet connection mechanism. In other embodiments, the computer system 600 may have a direct connection to the internet 420. In some embodiments, an expansion slot 615 may be included to allow a user to add additional functionality to the computer system 600.

The computer system 600 may include an I/O controller 616 providing access to external communication interfaces such as universal serial bus (USB) connections 626, serial ports such as RS-232, parallel ports, audio in 624 and audio out 622 connections, the high performance serial bus IEEE-1394 and/or other communication links. These connections may also have separate circuitry in some embodiments, or may be connected through a bridge to another computer communication link provided by the I/O controller 616. A graphics controller 617 may also be provided to allow applications running on the processor 601 to display information to a user. The graphics controller 617 may output video through a video port 629 that may utilize a standard or proprietary format such as an analog video graphic array (VGA) connection, a digital video interface (DVI), a digital high definition multimedia interface (HDMI) connection, or any other video interface. The video connection 629 may connect to display 630 to present the video information to the user. The display 630 may be any of several types of displays, including a liquid crystal display (LCD), a cathode ray tube (CRT) monitor, on organic light emitting diode (OLED) array, or other type of display suitable for displaying information for the user. The display 630 may include one or more light emitting diode (LED) indicator lights, or other such display devices. Typically, the computer system 600 includes one or more user input/output (I/O) devices such as a keyboard 627, mouse 628, and/or other means of controlling the cursor represented including but not limited to a touchscreen, touchpad, joystick, trackball, tablet, or other device. The user I/O devices may connect to the computer system 600 using USB 626 interfaces or other connections such as RS-232, PS/2 connector or other interfaces. Some embodiments may include a webcam 631 which may connect using USB 626, a microphone 625 connected to an audio input connection 624 and/or speakers 623 connected to an audio output connection 622. The keyboard 627 and mouse 628, speakers 623, microphone 625, webcam 631, and monitor 630 may be used in various combinations, or separately, as means for presenting information to the user and/or receiving information and other inputs from a user to be used in carrying out various programs and calculations. Speech recognition software may be used in conjunction with the microphone 625 to receive and interpret user speech commands.

The computer system 600 may be suitable for embodiments of the first server 101 and/or second server 102 and may store computer program code for executing the methods shown on flowchart 200 in FIG. 2 and/or flowchart 300 in FIG. 3. In some embodiments, a computer system 600 may store compute program code on its computer readable storage medium that is designed to be executed on a processor that is different than the processor 601, such as in the example of a firmware update service running on a computer system 600 acting as the third server 453.

As will be appreciated by those of ordinary skill in the art, aspects of the various embodiments may be embodied as a system, method or computer program product. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "server," "circuit," "module," "lighting gateway," "logic" or "system." Furthermore, aspects of the various embodiments may take the form of a computer program product embodied in one or more computer readable medium(s) having computer readable program code stored thereon.

Any combination of one or more computer readable storage medium(s) may be utilized. A computer readable storage medium may be embodied as, for example, an electronic, magnetic, optical, electromagnetic, infrared, or semiconductor system, apparatus, or device, or other like storage devices known to those of ordinary skill in the art, or any suitable combination of computer readable storage mediums described herein. In the context of this document, a computer readable storage medium may be any tangible medium that can contain, or store a program and/or data for use by or in connection with an instruction execution system, apparatus, or device.

Computer program code for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As used in this specification and the appended claims, the singular forms "a", "an", and "the" include plural referents unless the content clearly dictates otherwise. Thus, for example, reference to an element described as "a device" may refer to a single device, two devices or any other number of devices. As used in this specification and the appended claims, the term "or" is generally employed in its sense including "and/or" unless the content clearly dictates otherwise.

As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. §112, ¶6. In particular the use of "step of" in the claims is not intended to invoke the provision of 35 U.S.C. §112, ¶6.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A method of configuring a client-server relationship, the method comprising:
retrieving a unique identifier from non-volatile solid-state memory located within a network client;
sending the unique identifier from the network client to a first server, without any user action, by using a first server identifier to communicate across an internet connection;
receiving a packet of information at the network client from the first server identifying three different servers having three different functions;
sending data from the network client to a second server using a second server identifier;
retrieving a firmware update for the network client from a third server using a third server identifier;
receiving a request for information from a networked device at the network client; and
providing a fourth server identifier to the networked device from the network client in response to the request for information;
wherein the packet of information received at the network client comprises:
at least three different server identifiers including the second server identifier, the third server identifier, and the fourth server identifier;
an interval to wait between checking for updated firmware; and
at least one of:
a first port number to use in communicating with at least one of the first server, the second server, or the third server, without security;
a second port number to use in communicating with at least one of the first server, the second server, or the third server, using secure sockets layer (SSL) security; or
a string to use as a NetBIOS name for the network client.

2. The method of claim 1, wherein the first, second, third and fourth server identifiers respectively comprise four different Uniform Resource Locator (URL) strings.

3. The method of claim 1, wherein the unique identifier of the network client is a Media Access Control (MAC) address; and
wherein the second server identifier was determined based on the MAC address.

4. The method of claim 1, wherein the packet of information uses JavaScript Object Notation (JSON) syntax.

5. The method of claim 1, wherein at least one of the unique identifier or the first server identifier are stored in the non-volatile solid-state memory before the network client is installed.

6. The method of claim 1, further comprising:
receiving a second request for information from the networked device at the network client; and
providing HTML data from the network client to the networked device in response to the second request for information;
wherein the second request for information comprises an HTTP request.

7. The method of claim 1, further comprising:
receiving a second request for information from the networked device at the network client;
checking to see if a fourth server is available, using the fourth server identifier, in response to the second request for information;
providing HTML data from the network client to the networked device in response to the second request for information if the fourth server is not available; and
providing the fourth server identifier to the networked device from the network client in response to the second request for information if the fourth server is available;
wherein the request for information comprises an HTTP request.

8. The method of claim 1, further comprising:
updating at least some firmware in the network client using the firmware update.

9. A non-transitory computer readable storage medium having computer readable program code embodied therewith, the computer readable program code comprising:
computer readable program code configured to retrieve a unique identifier from within a network client;
computer readable program code configured to send the unique identifier to a first server, without any user action, by using the first server identifier to communicate across an internet connection;
computer readable program code configured to receive a packet of information from the first server to identify three different servers having three different functions;
computer readable program code configured to send data to a second server using a second server identifier;
computer readable program code configured to retrieve a firmware update from a third server using a third server identifier;
computer readable program code configured to receive a request for information from a networked device; and
computer readable program code configured to provide a fourth server identifier to the networked device in response to the request for information;
wherein the packet of information received comprises:
at least three different server identifiers including the second server identifier, the third server identifier, and the fourth server identifier;
an interval to wait between checking for updated firmware; and
at least one of:
a first port number to use in communicating with at least one of the first server, the second server, or the third server, without security;
a second port number to use in communicating with at least one of the first server, the second server, or the third server, using secure sockets layer (SSL) security; or
a string to use as a NetBIOS name for the network client.

10. The computer program product of claim 9, wherein the computer readable program code configured to retrieve said unique identifier from within the network client retrieves said unique identifier from a non-volatile storage location associated with a wireless networking interface integrated into the network client.

11. The computer program product of claim 9, the computer readable program code further comprising:
computer readable program code configured to receive a second request for information from the networked device; and
computer readable program code configured to provide HTML data to the networked device in response to the second request for information;
wherein the second request for information comprises an HTTP request.

12. The computer program product of claim 9, the computer readable program code further comprising:
computer readable program code configured to receive a second request for information from the networked device;
computer readable program code configured to check to see if a fourth server is available, using the fourth server identifier, in response to the second request for information;
computer readable program code configured to provide HTML data to the networked device in response to the second request for information if the fourth server is not available; and
computer readable program code configured to provide the fourth server identifier to the networked device in response to the second request for information if the fourth server is available;
wherein the request for information comprises an HTTP request.

13. The computer program product of claim 9, the computer readable program code further comprising:
computer readable program code configured to update at least some of the computer readable program code stored on the computer readable storage medium using the firmware update.

14. A network client comprising:
a processor; and
a network interface communicatively coupled to said processor and configured to send and receive data over a computer network;
wherein the processor is configured to:
retrieve a unique identifier and a first server identifier from within the network client;
send the unique identifier to a first server, through the network interface, without any user action, by using the first server identifier to communicate across an internet connection;
receive a packet of information from the first server, through the network interface, to identify three different servers having three different functions;
send data to a second server, through the network interface, using a second server identifier;
retrieve a firmware update from a third server, through the network interface, using a third server identifier;
receive a request for information from a networked device, through the network interface; and
provide a fourth server identifier to the networked device, through the network interface, in response to the request for information;

wherein the packet of information received comprises:
at least three different server identifiers including the second server identifier, the third server identifier, and the fourth server identifier;
an interval to wait between checking for updated firmware; and
at least one of:
  a first port number to use in communicating with at least one of the first server, the second server, or the third server, without security;
  a second port number to use in communicating with at least one of the first server, the second server, or the third server, using secure sockets layer (SSL) security; or
  a string to use as a NetBIOS name for the network client.

15. The network client of claim 14, wherein the unique identifier is stored in a non-volatile storage location associated with the network interface.

16. The network client of claim 14, wherein the processor is further configured to:
update at least some firmware of the network client using the firmware upgrade.

17. The network client of claim 14, wherein at least one of the unique identifier or the first server identifier are included in the network client before the network client is installed.

18. The network client of claim 14, wherein the processor is further configured to:
receive a second request for information from the networked device; and
provide HTML data to the networked device in response to the second request for information;
wherein the second request for information comprises an HTTP request.

19. The network client of claim 14, wherein the processor is further configured to:
receive a second request for information from the networked device;
check to see if a fourth server is available, using the fourth server identifier, in response to the second request for information;
provide HTML data to the networked device in response to the second request for information if the fourth server is not available; and
provide the fourth server identifier to the networked device in response to the second request for information if the fourth server is available;
wherein the request for information comprises an HTTP request.

* * * * *